April 13, 1948.  S. BLOOMFIELD  2,439,415
LOCK NUT
Filed July 29, 1944
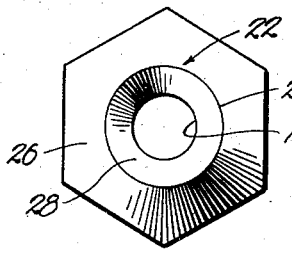
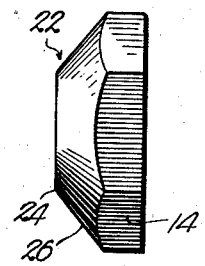
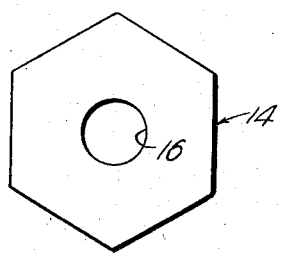
Fig. 1.   Fig. 2.   Fig. 3.
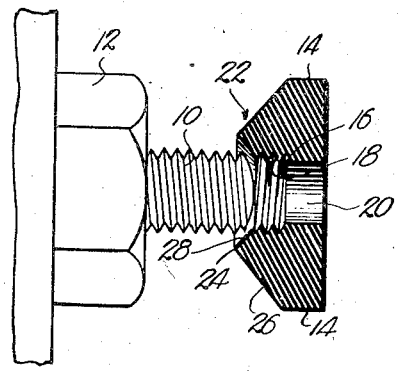
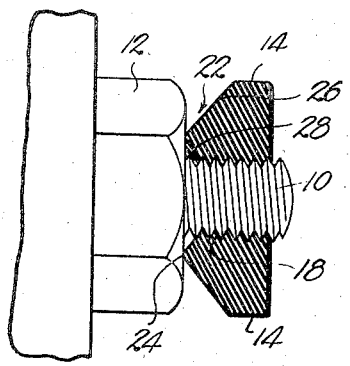
Fig. 4.   Fig. 5.
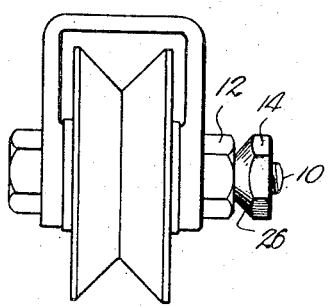
Fig. 6.
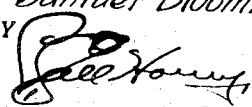
INVENTOR.
Samuel Bloomfield
BY
ATTORNEY.

Patented Apr. 13, 1948

2,439,415

UNITED STATES PATENT OFFICE 2,439,415

LOCK NUT

Samuel Bloomfield, Wichita, Kans., assignor, by direct and mesne assignments, to C. Earl Hovey, Kansas City, Mo., as trustee Application July 29, 1944, Serial No. 547,205

1 Claim. (Cl. 151—15)

This invention relates to securing means for threaded nuts and has for its primary aim the provision of locking means for said nuts after the same have been moved to the operative position along a threaded bolt or similar machine element.

A further object of this invention is to provide a lock nut for bolt-nut assemblies, which lock nut is specially designed to present a thin line of contact to the face of the nut against which it is forced and to present a body of impressionable material capable of having internal threads cut thereinto as the same is moved to the operative position along the threaded length of a bolt and against the nut with which it is being associated.

Another important object of this invention is the provision of a lock nut of the aforementioned character, having a specially designed ridge on one end thereof, which ridge is circular and concentric with the axis of rotation of the nut which the locking member is to engage after the said member has had threads cut thereinto by movement along the bolt upon which the protected nut is mounted.

A still further object of the present invention is the provision of an article of manufacture in the nature of a lock nut, the body whereof is formed of impressionable substance and which has a central bore, a portion of the length whereof is pre-threaded to conform to the size of the threads of the bolt with which the lock nut is to be associated, while a remaining part of the bore is initially smooth and of a relatively small diameter, whereby threads may be cut as the lock nut is moved to its operative position.

Other objects of the invention will appear during the course of the following specification, referring to the accompanying drawing, wherein:

Fig. 1 is an end elevational view of a lock nut made in accordance with the present invention.

Fig. 2 is an edge elevational view thereof.

Fig. 3 is an elevational view of the opposite end of the lock nut.

Fig. 4 is a cross sectional view through the lock nut, illustrating the same in a position just prior to introduction to the bolt and nut assembly.

Fig. 5 is a similar sectional view, but illustrating the lock nut in the operative position; and Fig. 6 is a side elevational view of the lock nut illustrating the same in practical application.

The lock nut 22 comprises a specially formed body made of fiber, metal, compressed paper, hard rubber, or any other substance impressionable by a threaded bolt 10, upon which it is forced when a conventional nut 12 must be protected against loosening.

The body is shown as hexagonal with wrench flats 14 and provided with a central bore 16, which has the end 18 provided with internal threads of a pitch and character similar to the external threads on bolt 10.

The remainder 20 of bore 16 is slightly smaller in diameter than the outside diameter of threads 18, so that as the body is forced to the position shown in Fig. 5, additional threads are cut into the impressionable substance along the normally smooth length 20 of bore 16.

The end 18 of the body has an annular ridge 22 integral therewith, which terminates at its peak in a thin line or edge 24. The converging sides or angled faces 26 and 28 of the body, definitely establish this thin line 24 and when the lock nut body is in the place clearly shown in Fig. 5, the fine edge of ridge 22 lies against the smooth outer end of nut 12 and substantially concentric to the longitudinal axis of bolt 10 upon which nut 12 is mounted.

Threaded length 18 of bore 16 insures the formation of threads along smooth length 20 as the body is applied to bolt 10. These threads which are cut by the threads on bolt 10, are of a nature requiring a tight grip between the bolt 10 and the newly threaded length of bore 16, and therefore, accidental rotary movement of the lock nut will not occur because of vibration incident to the use of the equipment with which the lock nut is associated.

Any tendency of nut 12 to turn will not be transmitted to the lock nut, made as above specified, for the thin edge 24 is insufficient in area to allow frictional engagement and turning of the lock nut. The concentric disposition of edge 24, with respect to the axis of rotation of nut 12, also insures that said nut 12 cannot move longitudinally along bolt 10 for the applied lock nut cannot be displaced after once being applied.

The diameter of the annular edge 24 is slightly greater than the diameter of bolt 10, and therefore, edge 24 is positioned against a smooth outer face of nut 12.

Lock nuts of the character illustrated and described, may be applied to all bolts forming a part of an automobile, for example, or of any piece of equipment where it is desired to insure rigidity of nuts 12.

Obviously, the use of a lock nut as above described, will not preclude tightening of nut 12 where such becomes necessary, and the angle of inclination of face 26 is great enough to permit the application of a wrench to nut 12 when tightening is desired. When nut 12 has been tightened, the lock nut may be turned to follow the same and thereby continue its effective action as a locking medium for the assembly.

Having thus described the invention, what is claimed as new and desired to be secured by Letters Patent is:

A lock nut for threaded bolts or the like having nuts thereon, comprising a homogeneous body of impressionable material provided with a bore for receiving the bolt or the like; a continuous annular ridge on one end of the body having a diameter greater than the diameter of the said bore, the said end of the body being composed of an inner and an outer annular converging face, meeting at the apex of the ridge, the outer face being wider than the inner face, whereby to provide a space between the nut on the bolt and the lock nut around the said ridge, said inner face merging at its innermost end with said bore, said ridge being thin at its peak to present a line contact concentric with the bolt and the nut thereon; and internal screw threads provided in the bore and along a portion of its length extending inwardly from the said end of the body, the remaining portion of the bore being unthreaded and having a diameter less than the diameter of the threaded portion of the bore.

SAMUEL BLOOMFIELD.

REFERENCES CITED

The following references are of record in the file of this patent:

UNITED STATES PATENTS

| Number | Name | Date |
| --- | --- | --- |
| 191,968 | Ibbotson | June 12, 1877 |
| 846,593 | Minne | Mar. 12, 1907 |
| 1,077,022 | Ward | Oct. 28, 1913 |
| 2,144,350 | Swanstrom | Jan. 17, 1939 |
| 2,360,531 | Wojtan | Oct. 17, 1944 |
| 2,365,380 | Bloomfield | Dec. 19, 1944 |

FOREIGN PATENTS

| Number | Country | Date |
| --- | --- | --- |
| 144,084 | Switzerland | Feb. 16, 1931 |
| 842,854 | France | June 21, 1939 |